US010125762B2

(12) United States Patent
Pangburn et al.

(10) Patent No.: US 10,125,762 B2
(45) Date of Patent: Nov. 13, 2018

(54) PUMP PORT ADAPTER (71) Applicant: Delavan Ag Pumps, Inc., Minneapolis, MN (US)

(72) Inventors: Gilbert Dean Pangburn, Spring Lake Park, MN (US); Matthew Wayne Hollister, Hudson, WI (US)

(73) Assignee: Delavan AG Pumps, Inc., Minneapolis, MN (US)

( * ) Notice: Subject to any disclaimer, the term of this patent is extended or adjusted under 35 U.S.C. 154(b) by 0 days.

(21) Appl. No.: 14/548,014

(22) Filed: Nov. 19, 2014

(65) Prior Publication Data

US 2015/0137516 A1    May 21, 2015

Related U.S. Application Data (60) Provisional application No. 61/906,823, filed on Nov. 20, 2013.

(51) Int. Cl.
*F04B 53/16* (2006.01)
*F16L 37/084* (2006.01)
*F16L 37/14* (2006.01)
*F04B 43/02* (2006.01)

(52) U.S. Cl.
CPC .......... *F04B 53/16* (2013.01); *F16L 37/0841* (2013.01); *F16L 37/142* (2013.01); *F04B 43/02* (2013.01)

(58) Field of Classification Search
CPC ......... F04B 53/16; F04B 43/02; F16L 37/142; F16L 2201/10; F16L 37/088; F16L 37/0841

USPC ............................ 285/305, 308, 317, 319, 12
See application file for complete search history.

(56) References Cited

U.S. PATENT DOCUMENTS

| 5,060,689 | A  | * | 10/1991 | Csaszar ................... 285/12 X |
| 5,468,028 | A  | * | 11/1995 | Olson |
| 6,761,163 | B1 | * | 7/2004  | Toth |
| 2007/0025811 | A1 | * | 2/2007 | Wilhelm |
| 2009/0167018 | A1 | * | 7/2009 | Lien .............................. 285/308 |
| 2009/0257897 | A1 | * | 10/2009 | Tojo ..................... F04B 53/007 417/559 |
| 2013/0300108 | A1 | * | 11/2013 | Frick .................. F16L 37/0841 285/319 |
| 2014/0021650 | A1 | * | 1/2014 | Kimberlin ........... B29C 45/2628 264/299 |

\* cited by examiner

*Primary Examiner* — Greg Binda
*Assistant Examiner* — Zachary T Dragicevich
(74) *Attorney, Agent, or Firm* — Merchant & Gould P.C.

(57) ABSTRACT

A fluid connection system for a pump or other fluid handling device includes adapters for connecting fluid lines and fittings of different diameters to a fluid port. The system includes a sliding quick disconnect element with an adapter inserting internally of the quick disconnect element into a bore of the port. The adapter includes a cylindrical body with an outer annular groove that receives an O-ring for sealing against the bore of the port. The adapter body includes a first portion having a first inner diameter and a second portion having a second portion having a second diameter for receiving the fitting from the fluid line. The quick disconnect element receives the adapter internally of the quick disconnect to retain the adapter. The adapters having different diameter internal cavities and may be interchanged for using the same port for fluid lines of different sizes and diameters.

12 Claims, 7 Drawing Sheets

PUMP PORT ADAPTER

BACKGROUND OF THE INVENTION

Field of the Invention

The present invention relates to a quick attachment connector system between a line and a port and in particular to a system including an adapter for connecting different size lines to different size ports.

Description of the Prior Art

Attachments to fluid lines to pumps and other devices are well known. Moreover, reliable quick connect and disconnect systems have been developed. Such connectors allow easy connection and disconnection of a line to the port while maintaining a secure fluid-tight path that prevents leaks and accidental disconnection. A variety of configurations have been developed to achieve such systems. The systems typically include gaskets between the connector and the port to maintain a fluid-tight path.

Although such fluid systems are quite useful and widely used, the systems are generally proprietary for each manufacturer as there are no industry standards for particular sizes and issues arise to compatibility. It can be appreciated that different types and models of pumps may be preferred or there may a need for upgrades that require a different size. However, the different pump or device may not mate correctly with the connector, therefore limiting the options or requiring complete replacement of all system components. Therefore, if changes are made to a different style or size pump or to a different manufacturer, such changes typically require a change of both the fluid line and the pump or using the same type of connector system for both.

It can therefore be seen that a new and improved connector system is needed. Such a system should include the ability to connect different sized lines and ports. Such a system should include adapters that provide for connectors and ports of different diameters and achieving a proper connection. Such systems should include gaskets to provide a water tight fluid path. Moreover, the adapter should maintain a quick connect and disconnect connection. The present invention addresses these as well as other problems associated with quick connect fluid systems.

SUMMARY OF THE INVENTION

The present invention is directed to an adapter such as may be utilized with pumps and other fluid devices with connection fittings or hoses to ports having a different size than the fitting or hose. The pumps and other devices utilized for fluid flow applications typically have an inlet port and an outlet port. Such ports may be configured for quick connect and disconnect to a hose or fitting should service or replacement be required. However, the particular configuration and/or sizes of such ports are limited to a particular style and/or size and more particularly are typically can only be used with a hose or fitting having a matching diameter and the same manufacturer.

The present invention relates to an adapter system that provides for using a fitting or hose of a diameter other than the diameter of the port in a quick disconnect system. The quick disconnect system includes a sliding retainer element that typically has a planar configuration with an opening formed therein. The opening includes a first portion with a first larger diameter contiguous with a second portion with a smaller second diameter. The fitting is inserted through the larger opening a predetermined distance. The retainer element is then slid so that the smaller diameter portion engages a groove in the fitting and to make a proper connection. Gaskets or other seals are utilized to maintain a fluid tight connection from the fluid lines through to the port. The port includes a resilient locking element that includes a finger or tab that extends into the opening and engages the retainer member.

The adapter includes a generally barrel-type cylindrical body having a first diameter portion inserting into the port. The first diameter portion leads to a larger second diameter portion that may be configured for receiving the fitting from the fluid line. It can be appreciated that the second diameter portion may have a smaller diameter than the first diameter portion and that the diameter may be varied to accommodate fittings of different diameters and sizes. The adapter body also includes an outer annular groove receiving an O-ring type gasket near the first inner end receiving an O-ring to provide a fluid tight seal between the adapter and the port. Moreover, the fittings typically include an O-ring or other seal to provide a fluid tight connection between the fitting and the adapter. The adapter is configured so that it may be slid into the port a sufficient distance so that the sliding quick disconnect retainer element slides externally of the second end of the adapter so that the adapter is retained completely internally of the quick disconnect planar element.

It can be appreciated that the present invention provides for interchanging pumps with fluid lines that do not match the diameter and size of the ports and still provides a quick and easy system for adapting to fluid lines and fittings of different diameters. The present invention quickly and easily connects and disconnects and is simple and inexpensive to manufacture.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views.

DETAILED DESCRIPTION OF THE PREFERRED EMBODIMENT

Figure 1:
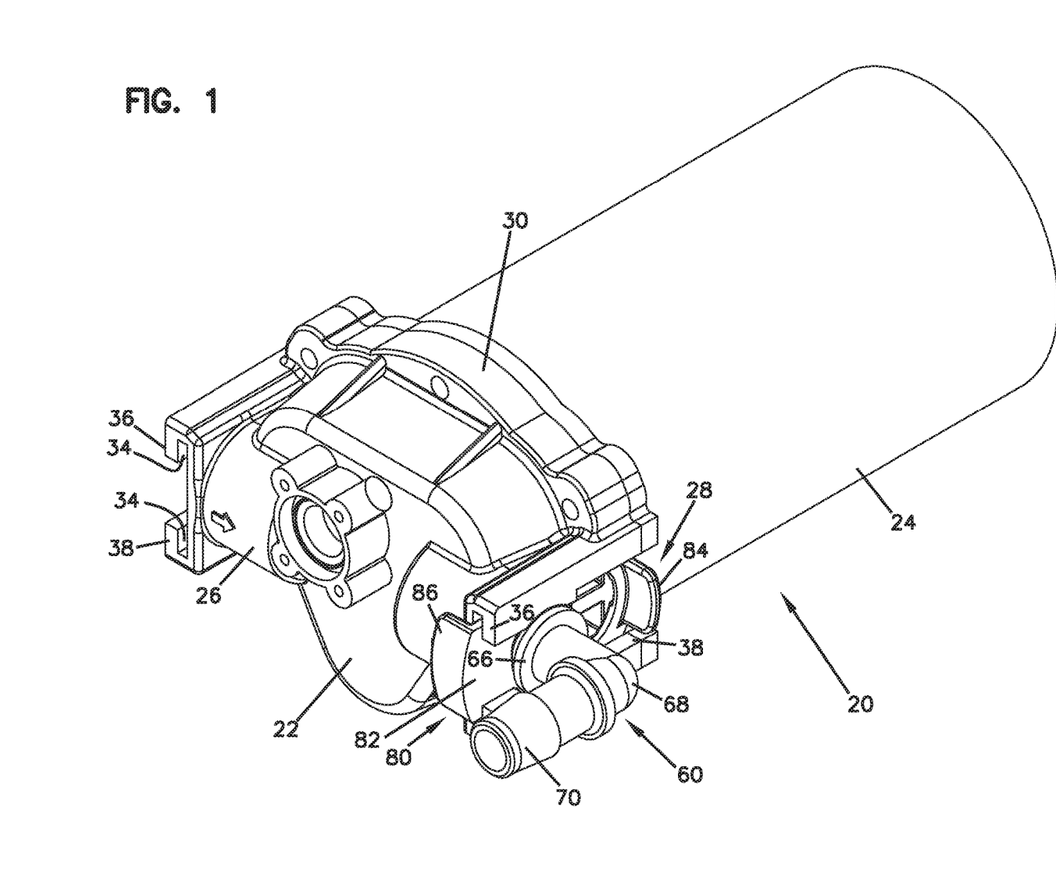
FIG. 1 is a perspective view of a diaphragm pump upper housing including a connector system for connecting a line to a port according to the principles of the present invention.
Figure 2:
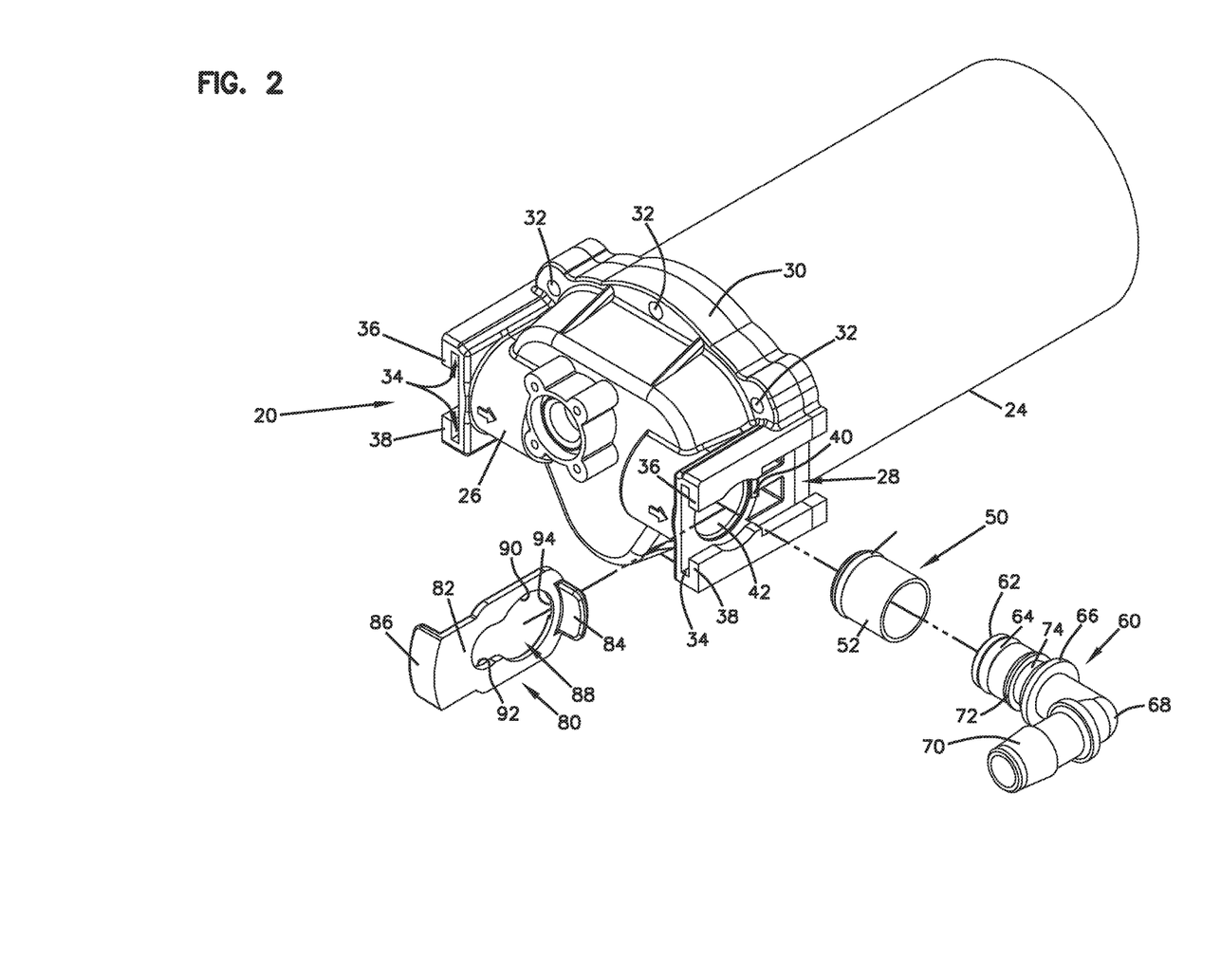
FIG. 2 is an exploded perspective view of the upper housing and connector system shown in FIG. 1.

Referring now to the drawings, and in particular to FIGS. 1 and 2, there is shown a pump, generally designated (20). Although a pump is shown, it can be appreciated that the present invention can adapt various ports, fittings and hoses of different sizes. The pump includes a body (24) and an upper housing (22). The upper housing (22) includes an inlet port (26) and a discharge port (28). The housing (22) mounts to the pump body (24) through bolts or other connectors extending through mounting holes (32) in a mounting flange (30). Pumps and other fluid devices connect to hoses and other fluid lines with a fitting, such as fitting (60) that connect to the inlet port (26) or discharge port (28). If the fitting (60) is of the correct size, it may be connected using a quick disconnect system without further modification. However, as different pumps and different models may have different sized ports, the connection must be modified to provide the quick disconnect to the different sized fittings and hoses. As shown for example in the configuration of FIG. 4, the insert portion (62) of the fitting (60) does not fit the bore (42) of the discharge port (28). An adapter (50) is utilized to achieve a quick disconnect that still allows for the pump to receive fittings and fluid lines of the original size as well as different sizes when the adapter is utilized.

Fittings (60) typically include the insert portion (62) and may include one more gaskets (64) to maintain a water tight seal. Moreover, a flange (66) may be utilized to create a shoulder so that the insert is inserted a correct distance into a port. Moreover, the fitting (60) includes a shoulder (72) which, with the flange (66), forms an annular groove (74) for receiving a quick disconnect slider retainer element (80). In the embodiment shown, the fitting (60) also includes a bend (68), although straight fittings may also be utilized. A hose connection (70) is configured to insert into the end of a fluid line and may be utilized with clamps or other retaining devices to maintain the hose securely onto the fitting (60).

Referring again to FIGS. 1 and 2, the ports (26, 28) each have a top flange and a bottom flange positioned around an opening (42). The top flange and bottom flange (26, 28) define a slot for receiving the quick disconnect slide element (80). A resilient retainer (40) is configured with a tab to engage a corresponding slot to retain the quick disconnect slide element.

Figure 3:
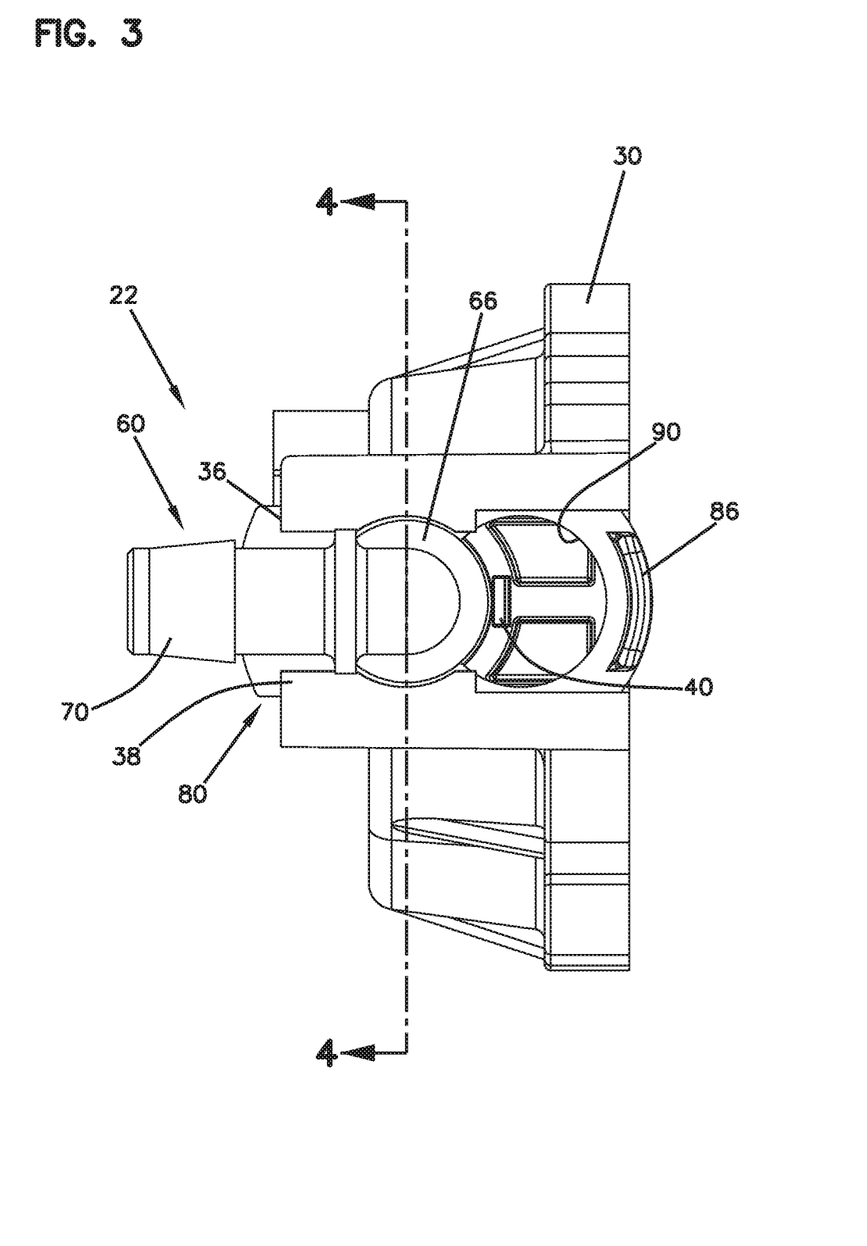
FIG. 3 is a side elevational view of the housing and connector system shown in FIG. 1.

The slide element (80) includes a planar portion (82) configured for extending into the slot formed by a top flange (36) and a bottom flange (38). At a first end of the planar portion, a first tab (84) extends in a first direction perpendicular to the planar portion (82) while at the second end of the planar portion (82); a second end tab (86) also extends out of the plane of the element (80) in a second opposite direction. The first end tab (84) is not as wide as the planar portion (82) so that the slide element (80) may slide between the top flange (36) and the bottom flange (38) when the planar portion (82) is in the slot (34) formed by the top flange (36) and the bottom flange (38). The quick disconnect sliding element (80) also includes an opening (88). The opening (88) includes a larger first diameter portion (90) contiguous with a second smaller diameter portion (92). A slot is formed in the face extending away from the first end tab (84) and extends to the opening (88) and is configured for receiving a locking element, as explained hereinafter. It can be appreciated that the sliding element is slid so that the larger first diameter portion (90) is aligned with the opening (42) for insertion of a fitting. The slide element (80) then is moved so that the smaller second diameter portion (92) of the opening (88) engages the groove (74) in the fitting and the resilient lock element (40) engages the opening (88) to retain the fitting in place, as shown in FIGS. 2 and 3.

Figure 4:
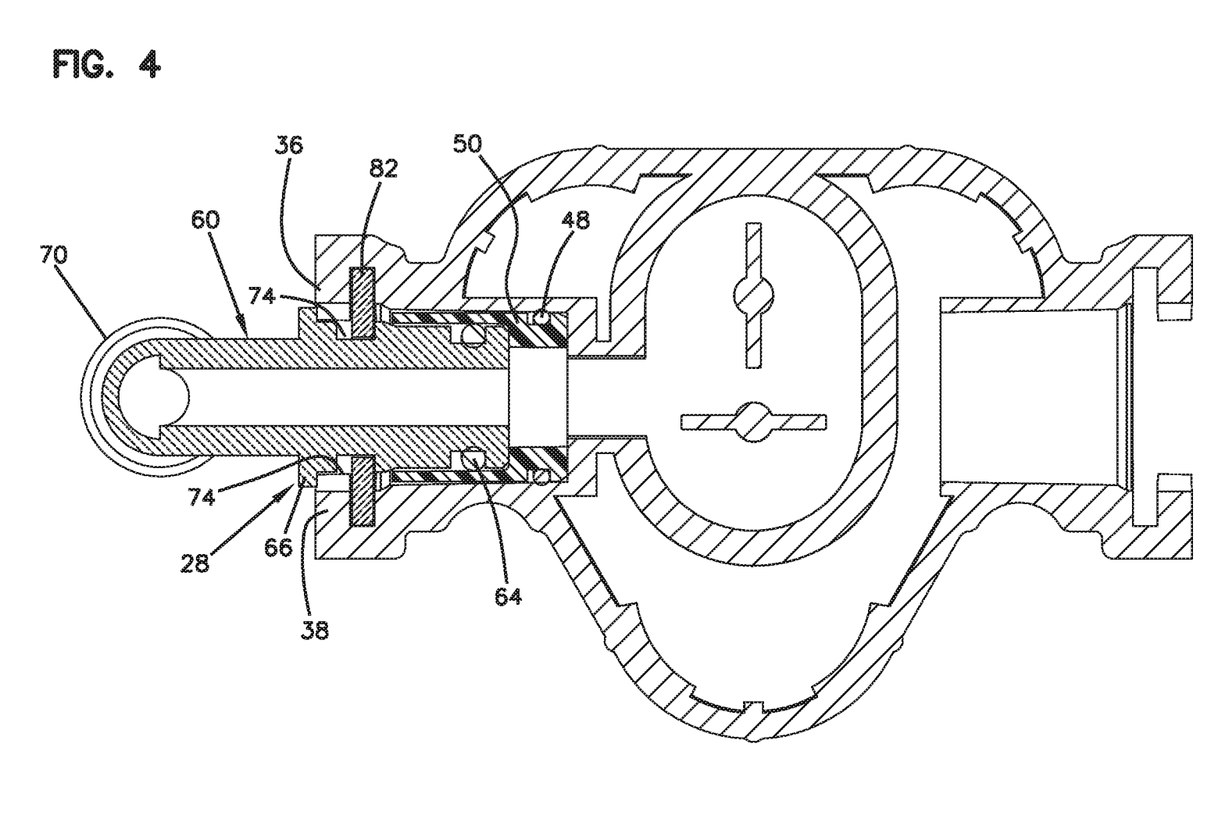
FIG. 4 is a side sectional view taken along line 4-4 of FIG. 3.
Figure 5:
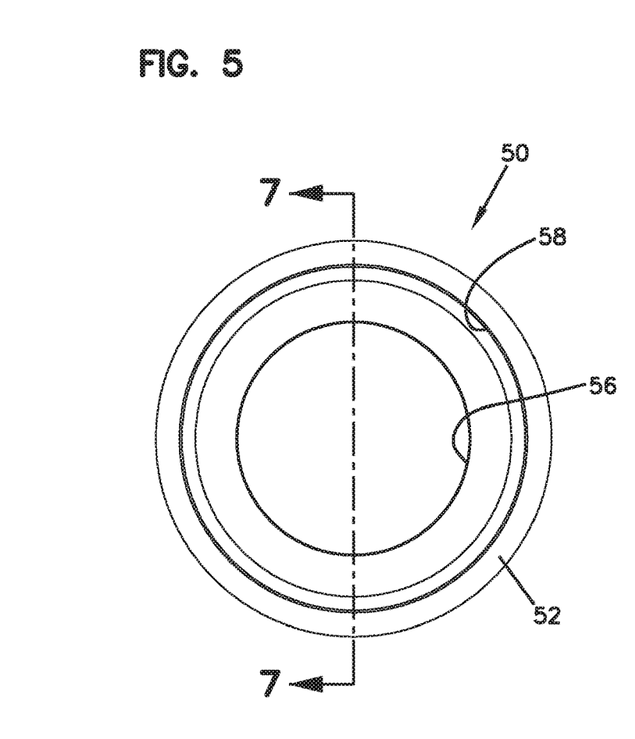
FIG. 5 is an end view of an adapter for the connector system shown in FIG. 1.
Figure 6:
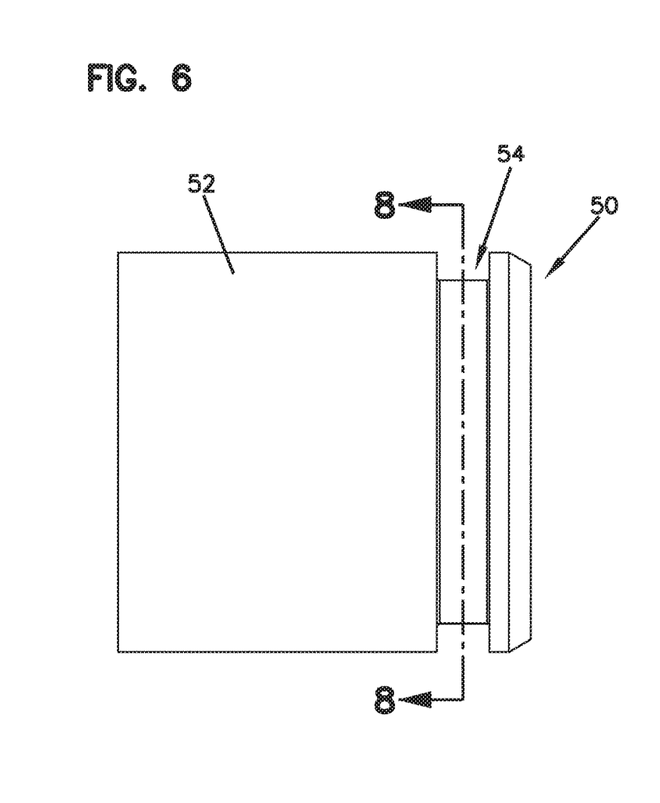
FIG. 6 is a side elevational view of the adapter shown in FIG. 5.
Figure 7:
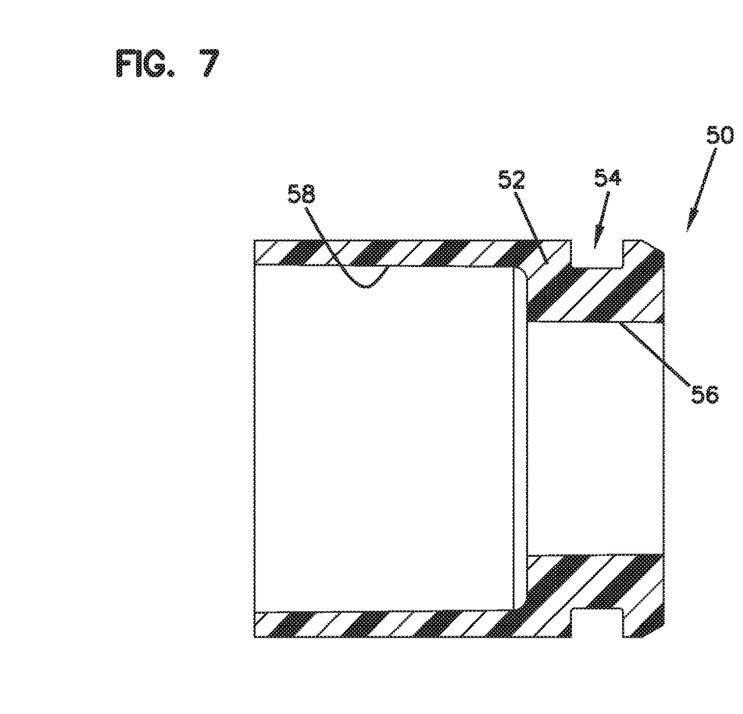
FIG. 7 is a side sectional view of the adapter taken along line 7-7 of FIG. 5.
Figure 8:
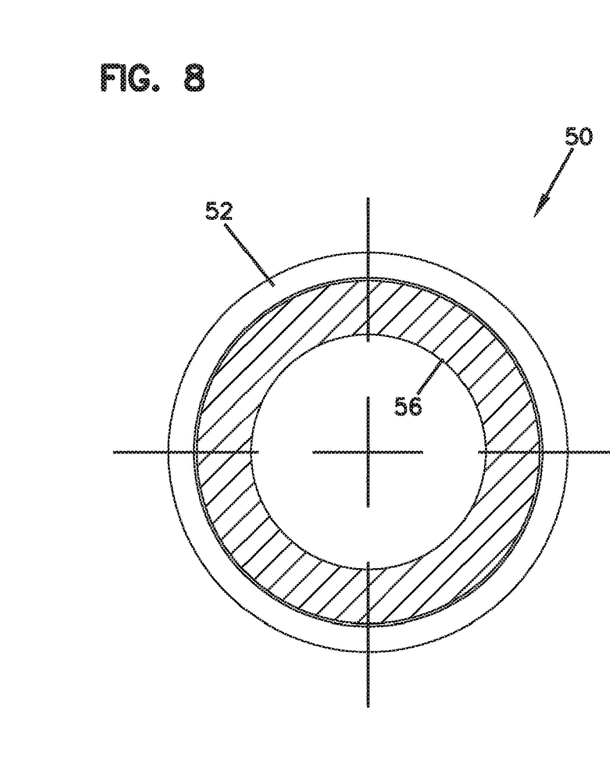
FIG. 8 is a sectional view taken along line 8-8 of FIG. 5.
Figure 9:
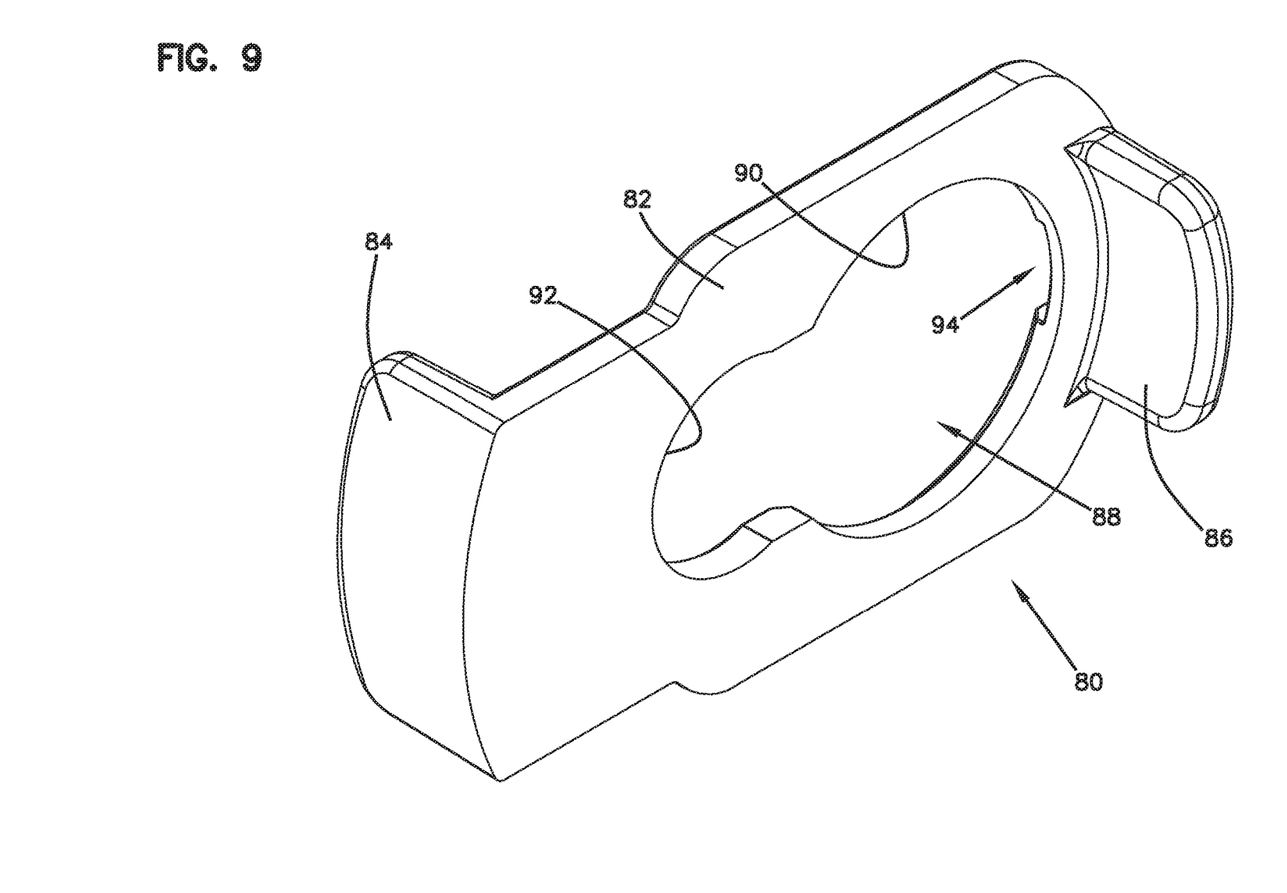
FIG. 9 is a perspective view of the quick disconnect slide clip for the connector system shown in FIG. 1.

As shown in FIG. 4, in embodiments in which the fitting (60) is not designed to fit the opening (42) of the ports (26, 28), a barrel-type adapter (50) is inserted that fits within the bore of the opening (42) and around the outer periphery of the fitting (60).

As shown in FIGS. 5-8, the adapter (50) is a generally hollow, cylindrical element. The adapter (50) includes a cylindrical body (52). An annular groove (54) is formed near the inner end of the adapter (50). The annular groove receives an O-ring type gasket (48) and is configured for engaging the inner cylindrical surface of the opening (42) of the ports (26, 28). The adapter (50) includes inner cylindrical surfaces including a first inner cylindrical portion (56) and a second inner cylindrical portion (58). The first inner cylindrical portion (56) is at the inner end of the adapter (50) and has a first diameter. The second inner cylindrical portion (58) is at the outer end of the adapter (50) and is configured for receiving the insert portion (62) of the fitting (60). When inserted, the adapter (50) is retained in the port (28) completely interiorly of the quick disconnect slide element (80), as shown most clearly in FIG. 4.

To mount the fitting (60) securely, the adapter (50) is first inserted into a port such as discharge port (28). The quick disconnect slide element (80) is then slid into the slot (34) formed by the top flange (36) and the bottom flange (38). The quick disconnect element (80) is positioned so that the large first diameter portion (90) of the opening (88) is aligned with the opening (42) of the port (28). The larger first diameter portion (90) of the opening (88) is configured to receive the insert portion (62) of the fitting (60). The smaller second diameter portion (92) of the opening (88) is sized to engage with the annular groove (74) of the fitting (60). The insert portion (62) of the fitting is then inserted through the opening (88) and into the second inner cylindrical portion (58) of the adapter (50). When fully inserted, the slide element (80) is slid laterally until the smaller second diameter portion (92) is aligned with the opening (42) and engages the annular groove (74) of the fitting (60). The adapter, insert and second diameter portion (92) are then all longitudinally aligned. Moving the quick disconnect slide element (80) also moves the resilient retainer member (40) to engage the edge of the opening (88), as shown most clearly in FIG. 3.

When fully assembled, the fluid path is completely sealed with the O-ring (48) of the adapter (50) engaging the inner wall of the bore (42) of the port (28). Moreover, the O-ring type gasket (64) of the fitting (60) engages the inner wall of the second cylindrical portion of the adapter (50). The second diameter portion (92) extends around the annular groove (74) in the fitting (60) to prevent removal or movement of the fitting (60). Moreover, the retainer (40) engages the inner edge of the opening (88) of the slide element (80) to maintain the slide element in the correct position. The secure relationship prevents movement of any of the various elements or accidental removal.

Although the connection is secure, removal is also easily accomplished. The retainer (40) is exposed and is simply pushed inward until it clears the edge of the slot (94) in the quick disconnect element (80). The quick disconnect element (80) may then be slid until the large first diameter portion (90) is aligned with the insert (60) and the bore (42). The first diameter portion (90) is larger than the shoulder (72) of the fitting (60) so that the insert portion (62) may simply be pulled directly outward. The adapter (50) may also be removed after the slide element (80) is detached so that the adapter (50) may also be pulled out of the bore (42).

It can be appreciated that the quick disconnect system of the present invention provides for adapting to different size fittings by simply changing the inner diameter of the second cylindrical portion (58) of the adapter (50) and by changing the diameter of the second smaller diameter portion (92) of the quick disconnect slide element (80) to match the particular fluid line or fitting (60) mounting to the port (26, 28). Therefore, interchangeable adapters (50) having a different internal diameters in the second cylindrical portion (58) may be used to match the configuration of the fluid line or fitting (60). In each of these configurations, a reliable leak free fluid seal is maintained and quick connection and disconnection is provided.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An adapter assembly comprising:
   a first fitting having an outer diameter;
   a port having an inner surface having a diameter greater than the outer diameter of the first fitting;
   an adapter comprising:
   a cylindrical body having an exterior with an annular groove on the exterior of the cylindrical body; the exterior having a constant exterior diameter along the cylindrical body on both sides of the annular groove; the cylindrical body configured to insert into the port and having a first end and a second end, with an open interior configured to receive the first fitting;
   a first cylindrical portion at the first end, the first cylindrical portion extending radially inward and defining a center opening, the center opening defining a first diameter and the open interior defining a second interior having a diameter greater than the first diameter; and
   a gasket fitting into the annular groove and configured to engage the inner surface of the port; wherein the port defines a slot, the adapter assembly further comprising a sliding retainer element sliding in the slot and engaging the first fitting; and
   wherein the sliding retainer element includes an opening and the port includes a resilient retainer including a tab portion engaging the edge of the opening of the sliding retainer element when connected with the adapter positioned completely interiorly of the tab portion.

2. An adapter assembly according to claim 1, wherein the cylindrical body and the first cylindrical portion comprise a monolithic element.

3. An adapter assembly according to claim 2, wherein the cylindrical body and the first cylindrical portion comprise a plastic element.

4. An adapter assembly according to claim 1, wherein the annular groove is aligned with the first cylindrical portion.

5. An adapter assembly according to claim 1, wherein the adapter is housed within the port and interiorly of the sliding retainer element.

6. An adapter assembly according to claim 1, wherein the first fitting extends into the open interior of the cylindrical body and includes an annular groove engaging an edge of an opening of the sliding retainer element when connected.

7. An adapter assembly according to claim 1, the fitting being inserted into the second end of the cylindrical body and into the open interior and abutting the first cylindrical portion.

8. An adapter assembly comprising:
   a plurality of first fittings, each of the first fittings having a different outer diameter;
   a port having an inner surface having a diameter greater than the outer diameter of each of the plurality of first fittings;
   interchangeable adapters configured for inserting into the port, each of the adapters comprising:
   a cylindrical body having an exterior with an annular groove on the exterior of the cylindrical body; the cylindrical body having a constant exterior diameter along the cylindrical body on both sides of the annular groove; the cylindrical body configured to insert into the port and having a first end and a second end, with an open interior configured to receive a first fitting of the plurality of first fittings;
   a first cylindrical portion at the first end, the first cylindrical portion extending radially inward and defining a center opening;
   an annular groove on the exterior of the cylindrical body; and
   a gasket fitting into the annular groove and configured to engage the inner surface of the port;
   wherein the interchangeable adapters include open interiors of different diameters, each of the open interiors being configured for receiving a first fitting of the plurality of first fittings having a complementary outer diameter.

9. An adapter assembly according to claim 8, the fitting is inserted into the second end of the cylindrical body and into the open interior and abutting the first cylindrical portion.

10. An adapter assembly according to claim 8, wherein the cylindrical body and the first cylindrical portion comprise a monolithic element.

11. An adapter assembly according to claim 10, wherein the cylindrical body and the first cylindrical portion comprise a plastic element.

12. An adapter assembly according to claim 8, wherein the annular groove is aligned with the first cylindrical portion.

* * * * *